Figure 1:
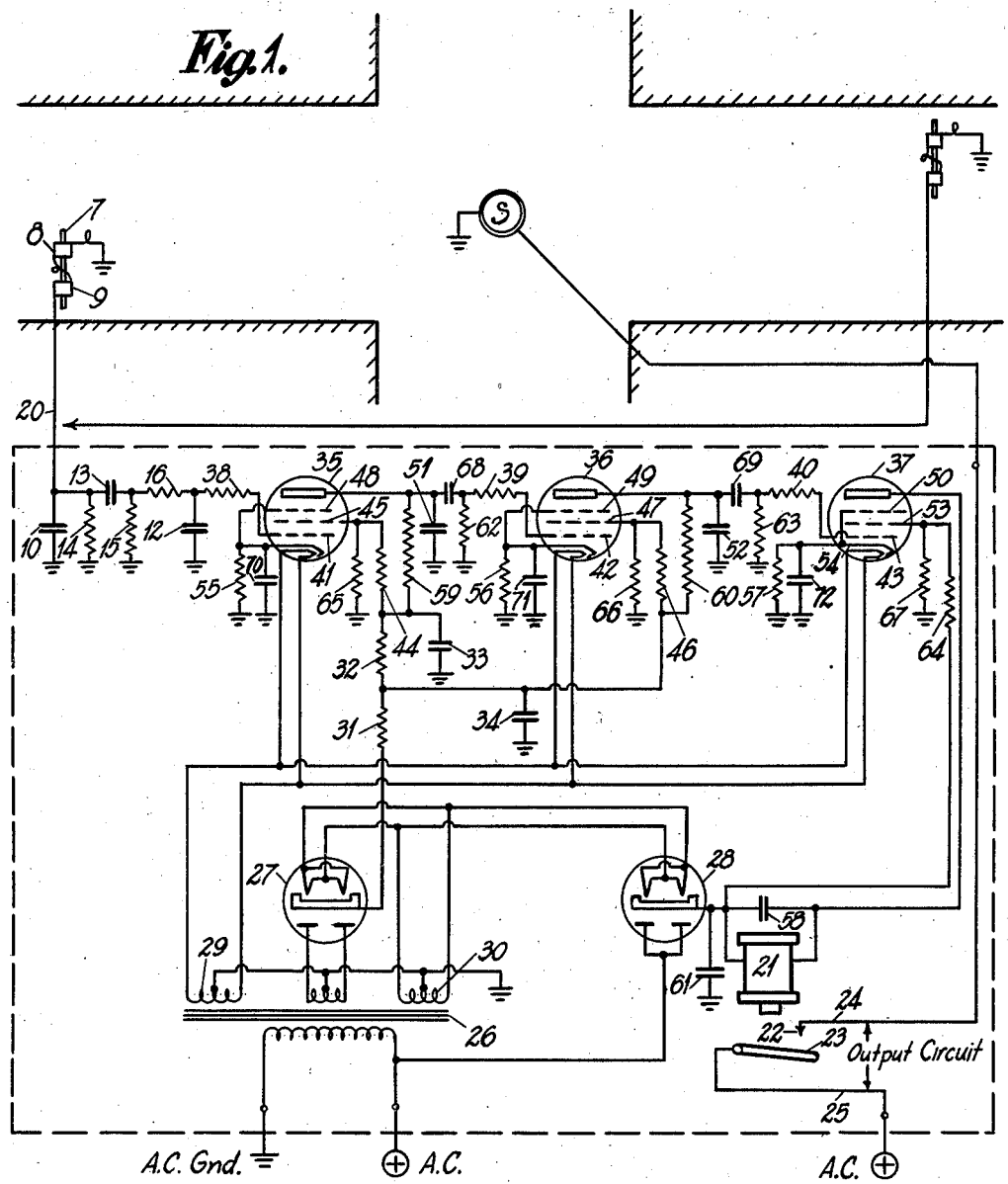

May 21, 1940.　　　　J. L. BARKER　　　　2,201,145
TRAFFIC DETECTOR
Filed July 3, 1936

A.C. Gnd.　　⊕ A.C.　　　　A.C. ⊕

INVENTOR.
JOHN L. BARKER
BY Edward H. Cairns
ATTORNEY

UNITED STATES PATENT OFFICE 2,201,145

TRAFFIC DETECTOR

John L. Barker, Pleasantville, N. Y., assignor to Automatic Signal Corporation, New York, N. Y., a corporation of Delaware Application July 3, 1936, Serial No. 88,754

8 Claims. (Cl. 177—337)

This invention relates to traffic detectors and more particularly to devices of a magnetic type for detecting vehicles or other forms of traffic in streets, roadways, driveways, garage doorways, tunnels or any path of travel. The invention has for its general object the provision of an improved type of magnetic detector unit adapted to be located in or adjacent to a traffic path and to generate an impulse upon the passage of traffic, and a novel type of impulse responsive mechanism particularly adapted for use therewith.

It is well known that a coil of wire interlinked with a magnetic field, either the earth's natural magnetic field or a field provided by a simple magnet or electromagnetically, will have an electromotive force generated in it if the strength of the magnetic field interlinking the coil is varied. Thus with such a coil and magnet for example located adjacent to the path of travel of a vehicle or other body containing a considerable amount of magnetic material, the passage of such a body close to the coil will provide momentarily a better path or magnetic circuit than air for the magnetic field and the field will be strengthened momentarily, and a corresponding electromotive force will be generated in the coil. This electromotive force is of a transient character in that it lasts only while the body is passing so as to change the field strength, and it is referred to herein as a wave or impulse. This electromotive force may be used for operating a warning signal, a traffic signal, a traffic actuated signal controller, a bell or other signalling device, or for operating doors or counting traffic for example.

Various arrangements have been suggested in the prior art for employing this principle of generation of an electromotive force on passage of a body of magnetic material near such a coil to detect the passage of such body, as for example in detecting the passage of a motor vehicle along a roadway over a coil and magnet buried in the roadway.

Ordinarily with practical sizes of coils and magnets the electromotive force generated by vehicles under such conditions is so small that it will directly operate for signalling purposes only a most sensitive relay, as for example a galvanometer type relay. This sensitive relay must be delicately balanced and have moving elements of very slight mass with the result that it is easily subject to damage by overloading and by vibration from any jarring disturbances naturally occurring near the path of traffic. Since very delicate adjustment must be made to the contacts of such a relay, servicing this apparatus is extremely difficult.

Another difficulty in the use of such a magnetic detector in the past has been the rather indefinite and irregular limits of influence of the magnetic field extending from the ends and sides of the magnet and coil unit, which has resulted in considerable variation in the amplitude of the impulses or waves of electromotive force generated by vehicles passing over different parts of the unit, and consequent irregularity of response to passing vehicles has occurred which has made it difficult to employ the impulses for signalling purposes.

Still another difficulty in the use of sensitive magnetic detectors and a sensitive relay responsive to the impulses generated, is the effect of stray magnetic fields from power lines, street railway lines and other electrical systems present in or near the roadway, which sometimes is great enough to cause frequent false impulses.

I have determined that the voltage waves or impulses generated in a magnetic unit of this preferred type by the passage of a vehicle are substantially proportional in electromotive force and transient frequency (or steepness of wave front) to the speed of the vehicle, and that such impulses have a frequency range which can be readily selected by a modification of a well known form of selective electrical network or filter employed in the communication art. This frequency range varies with the design of the magnet and coil unit and consequent distribution of the magnetic field but my tests have indicated that with a field of normal strength over the magnetic unit and ordinary traffic speeds a filter network designed to pass frequencies ranging from three to forty cycles is suitable. This is especially significant in that the detection in this manner of the particular narrow band of frequencies makes possible great amplification of the signal impulses generated by an actuating vehicle without corresponding amplification of all interfering impulses induced in the magnetic unit by nearby power lines and street railway lines, a large portion of which extraneous impulses have a frequency mostly outside this range. This selective amplification, as made possible through the selective electrical network provided in accordance with the invention, permits the use of an ordinary relay of considerable contact capacity for signalling purposes as directly responsive to vehicle actuation thru the medium of the magnetic detector and associated filter network and amplifier, and the whole system is highly sensitive to proper vehicle impulses and highly insensitive to mechanical vibration and to a considerable range of extraneous impulses from interfering electrical fields.

It is an object of this invention to provide a vehicle detector that will be dependently responsive to the passage of vehicles and relatively nonresponsive to extraneous factors.

It is an additional object to provide an improved relay device responsive to small voltage impulses generated by vehicles passing near a magnetic coil or similar electrical unit in a roadway.

A further object is to provide a vehicle detector of a magnetic type which will provide a signalling impulse substantially inversely proportional to the speed of a vehicle actuating it.

With these objects in mind reference may now be had to the accompanying drawing illustrating embodiments of my invention, and in which Figure 1 illustrates a preferred form of magnetic detector unit in a roadway together with a signal and a preferred responsive mechanism for operating the signal in response to passage of a vehicle.

Figure 2:
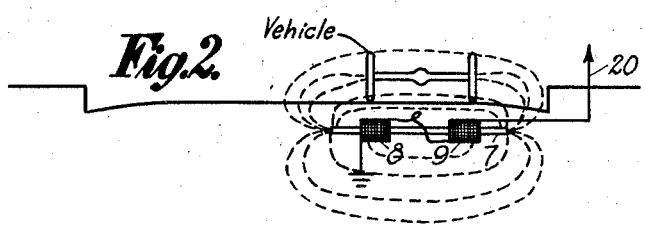

Figure 2 is a sectional view of a street or roadway showing a preferred arrangement and form of magnetic detecting device located below the street surface with its magnetic field intensified by a vehicle passing over it.

Referring now to Figure 1, there is shown a roadway in which the magnetic detector unit is located. A preferred form of such a unit may be comprised of a suitable length of bar or bundle of rods of iron 7 or other magnetic material of reasonably high permeability which has been given a permanent magnetism, or which is maintained magnetized by supplementary magnetizing means, and a coil or pair of coils wound around the bar. The coil or coils may extend over the center portion of the bar or over its entire length but it has been found that most satisfactory results are obtained if a pair of coils 8, 9 are used and each of these has a length approximately one-sixth the length of the bar and is symmetrically located thereon so that each coil is spaced approximately one-sixth of the length of the bar from the end.

The coils may for example be connected in series in the manner indicated and are preferably armored against dampness and drainage water by suitable waterproofing material. The entire unit may be cast in concrete or other nonmagnetic material as a further precaution against damage by moisture or abrasion.

As indicated in Figure 2 the magnetic unit may preferably be buried a short distance below the road surface and the passage of a vehicle over the unit causes a considerable increase of strength of the field of the magnet, since the iron of the vehicle provides a much better magnetic path than the air through which the magnetic circuit was completed prior to the arrival of the vehicle.

My tests also indicate that the passage of a magnetic body into proximity with the magnet may be considered to have the effect of causing the body to become magnetized and the body in turn magnetizes the magnet in such a direction as to increase or strengthen the latter's magnetic field. I have also found that it is not necessary for the coil employed to encircle the magnet, but that the coil may be located anywhere within the practically effective range of the magnetic field induced in the magnetic body, so that changes in this field which links the coil will produce an electromotive force in it.

It is well known that the permeability of a magnetic material generally is smaller as the retentivity or permanency of magnetism of the material is larger, and conversely that the permanency of magnetism produced in such material generally is less as the permeability of the material is greater. However the relation between these properties is not reciprocal. When a large portion of the permanent magnet is linked by the coil of the present magnetic detector unit, whatever the cause of the increase in strength of the field linking the coil, I find that the largest wave of electromotive force is obtained when the product of the permanent magnetism times the permeability of the permanent magnet is a maximum.

It will be appreciated that as the vehicle approaches the magnetic unit the flux change or change of intensity of the magnetic field occurring is one of building up the flux and a voltage of one polarity is induced in the coils of the unit. While the vehicle is passing over the unit there is momentarily no appreciable change in the flux, and it remains at the value to which it is built up by the presence in the field of the magnetic material of the vehicle. In this brief period of no flux change the induced voltage is again zero, and as the vehicle leaves the magnetic field the strength of the latter again falls to its original value. Accordingly a voltage of opposite polarity is now generated.

A voltage proportional to the rate of change of the flux linking the coil is induced in the coil, and this voltage will be roughly proportional to the speed of the vehicle passing the detector. If the vehicle is moving rapidly, the flux will build up at a very rapid rate and fall off at a very rapid rate, and since the same amount of flux change occurs regardless of the speed, the time rate of change of the flux will be high and the voltage induced in the coil will be relatively high. Correspondingly vehicles moving at low speeds produce lower induced voltages roughly proportional to the speed of the actuating vehicle.

The voltage wave produced will not only have a greater peak with greater vehicle speed but will also reach this greater peak in shorter time and thus will have a wave form of steeper wave front and a frequency characteristic which is proportional to the speed of passing traffic. This frequency characteristic of the single wave produced by passage of a single vehicle is the equivalent of the frequency this transient wave would have if repeated as a periodic oscillation.

The frequency characteristic of the impulses generated by passage of vehicles is employed in selectively amplifying these impulses for signalling purposes. The proportional relation between this frequency of the impulse and the speed of traffic can be employed with advantage especially in traffic actuated control systems as disclosed in Letters Patent No. 2,044,907 granted June 23, 1936, to F. G. Kelly, Jr.

It is desirable to have the amplitude of the voltage impulse generated as uniform as possible throughout the length of the magnetic unit irrespective of the portion traversed by a vehicle in order to give proper coverage of a traffic lane or path in detecting the passage of traffic therein.

It has been found that two coils located near the ends of the magnet are more satisfactory than a single coil centered on the magnetized bar in giving such a uniform response. This will be apparent when the field pattern of a long slender magnet, shown in Figure 2, is considered. All of the magnetic field in the center of the magnet does not continue entirely to the end of the bar, a considerable portion of the flux leaving the sides of the magnet near its ends. There is a tailing off of approximately twenty per cent of the flux in the area near the ends. By locating the coils very close to this area it is easy to have this tailing flux fall back into the magnet if a better magnetic circuit is provided than air. Such an arrangement makes the response of the detector symmetrical and the impulse of the unit for a passing vehicle is quite uniform as long as some part of the vehicle passes over the detector.

The embodiment of the impulse responsive unit shown in Figure 1 consists essentially of an electrical selective network for absorbing high frequencies and passing low frequencies, a two-stage resistance-capacity coupled amplifier driving an output amplifier to which is connected a relay having contacts suitable for operation of control equipment. The output amplifier is used principally for the purpose of matching the relay to the amplifier, consequently this unit is primarily for increasing energy output rather than for further amplifying voltages from the first amplifier. Separate rectifiers are preferably employed for each amplifier to keep down regeneration which is present in any high gain amplifier using over one stage of amplification.

The condensers 10, 12 and 13, and resistors 14, 15 and 16 constitute a selective electrical network or filter; condensers 51, 52, and 58 also modify the output from the network but their importance is relatively small in this connection.

One of the advantages of my detector unit is that the period the output or signal relay contacts 22, 23 remain closed is approximately inversely proportional to the speed of the actuating vehicle, a feature very desirable in the vehicle actuated signalling field. Such a relationship is attained by providing an impulse responsive unit for use with the magnetic pavement unit in which the determining factor in controlling the length of time the output relay contacts are closed is the frequency of the voltage impulse received from the detector unit, rather than the magnitude of such voltage. In order that the unit be responsive to the speed of the actuating vehicle so that the length of the output relay 21 impulse over wires 24, 25 will be inversely proportional to the vehicle speed, the electrical network attenuates the high frequency voltages to approximately the same value as those voltage waves of lower frequency which reach relay 21, and which are caused by slower moving vehicles.

Satisfactory results have been obtained when the electrical network is designed to absorb substantially all frequencies below one cycle and above fifty cycles per second. The cutoff near these points is not sharply defined, however. In th lower range between these values substantially all of the waves are passed, but as the frequency in this range increases an increasingly greater portion of the waves are absorbed. Any alternating currents which are of frequency outside the transmissive range of the network and which find their way into the magnetic pavement unit either thru electromagnetic or electrostatic coupling in the unit are substantially all absorbed by the electrical network before reaching the first tube in the first stage of amplification.

Resistance-capacity coupling is preferably used between stages in the first amplifier unit and also between the two amplifiers. This type of coupling has a number of advantages over other forms in that it is affected only by voltage variations, therefore the unit is self-adjusting for extraneous disturbances and eliminates the necessity for compensatnig or balancing the circuit or providing critical mechanical and electrical adjustment. Where the stages of a unit are joined by a direct D. C. coupling the unit inherently works from a fixed reference level, changes of tube characteristics, circuit changes, voltage changes all disturb the balance of the unit, a difficulty overcome by the design of the present embodiment. Magnetic couplings are also unsatisfactory in that magnetic circuits with sufficiently high impedance for them to be responsive to the low frequencies encountered in this type of unit are not practically attainable.

D. C. power for the amplifiers is obtained from a transformer 26, whose primary is supplied from an A. C. power source, and rectifier tubes 27, 28 one for each of the amplifiers. These rectifier tubes may be of the full-wave type, as shown, and additional secondary windings 29 and 30 on the transformer serve to provide power for the heaters in the rectifiers and in the several amplifier tubes. It will be appreciated that instead of operating the amplifier from an alternating current supply as shown in the drawing, direct current from a suitable source, as from batteries, may be used to provide the necessary potentials, and the indirectly heated cathode type of tubes replaced by tubes in which the cathode is heated directly, in which latter case separate direct current sources are employed for each tube. The rectifier circuit for the first amplifier, consisting of tube 27, transformer 26, resistances 31 and 32 and condensers 33 and 34, has a time constant of preferably about 10 seconds. The branch of this circuit embracing condenser 34, to the second stage in the voltage amplifier has a time constant of preferably about two seconds. The high values of time constants are desirable to keep line voltage surges out of the amplifier, particularly where the present apparatus is used in conjunction with signal lights, door opening mechanism, or the like, and where the amplifier unit is connected to the same supply line with the equipment which causes considerable disturbance on the line.

The tubes 35, 36, 37 in the present embodiment are high voltage gain pentodes having inherent shielding, and to insure long life they are preferably worked considerably below normal rating. Tube 37 is further chosen with regard for its values of transconductance and internal resistance, which should approximate the resistance of the output relay 21. The input to the tubes is protected against overloading by the insertion of very high resistances 38, 39 and 40 in series with the control grids 41, 42 and 43. D. C. for the screen grid potential in the first amplifier is connected from rectifier 27 as described over resistors 31, 32 and 44 to screen grid 45 and over resistors 31 and 46 to screen grid 47. All suppressor grids 48, 49 and 50 are connected directly to their respective cathodes for the purpose of giving them a potential to eliminate secondary emission in the tubes. The tubes are self-biased to insure stability of operation. The coupling circuits preferably have a time constant of approximately one and a half seconds making the amplifier sensitive to frequencies as low as the order of one or two cycles per second, which are slightly lower frequencies than the selective electrical network passes. Magnetic and electrostatic disturbances set up by adjacent parts are substantially reduced by means of condensers 51, 52, and 58. Very high value condensers 70, 71 and 72 between the cathodes of the amplifier tubes and ground, paralleling resistors 55, 56 and 57, produce a considerable increase in the gain of the amplifiers, but may be omitted.

The screen grid 53 of output amplifier tube 37 is biased by direct current from rectifier tube 28, and the suppressor grid 50 is connected directly to the cathode 54. Resistances 55, 56 and 57 between cathodes and ground are the self-biasing resistances. Rectifier tube 28 is shown in the drawing to be operated from full A. C. line voltage, although a lesser voltage might be used depending upon the type of output amplifier circuit used. Condenser 58 shown in parallel with the relay coil is a low capacitance condenser which tends to prolong somewhat the impulse produced for extremely rapid moving vehicles.

In practice I have found that satisfactory results are obtained from an embodiment of my impulse responsive device illustrated wherein tubes of types specified and values of resistance and capacitance listed below are employed. It will be appreciated that the following specifications for one embodiment are approximate; that many of these values may be altered considerably in accordance with the characteristics of the individual tubes actually used; that the leakage of all condensers is herein assumed to be substantially nominal in each case. In the low pass filter portion of the equipment resistances 14, 16 and 15 conveniently may respectively be of the range 2,000, 2,000,000, and 6,000,000 ohms. Condensers 10, 13 and 12 are preferably of the order of 10, .5 and .25 microfarads respectively.

In the rectifier units resistance unit 31 is conveniently 35,000 ohms, to provide a suitable time constant, units 44, 46 may be 50,000 ohms. units 32, 59 and 60, 100,000 ohms each. Condensers 33 and 34 are respectively 100 and 30 microfarads. By-pass condensers 51 and 52 in the amplifiers may be .25 microfarad and condenser 61, 5 microfarads, condenser 58, .5 microfarad. Resistances 38, 39 and 40 for protecting against overloads in the input circuits to the amplifier tubes are of the order of 2,000,000 ohms. Resistors 62 in the first amplifier and 63 in the second amplifier are 3,000,000 ohms and resistor 64 in the second amplifier is preferably 25,000 ohms, as are resistances to ground 65, 66. The corresponding resistor 67 from screen grid to ground in the output amplifier is 50,000 ohms. Condensers 68 and 69 preferably are .5 microfarad. Resistances 55, 56 and 57 from cathode to ground are of the order of 2,000 ohms each, and high capacitors 70, 71 and 72 paralleling them, each 500 microfarads. All condensers except those with capacitance of .5 or .25 microfarad are of the electrolytic type. The coil of quick acting output relay 21 has an impedance of 6,500 ohms. The input impedance to the amplifier is approximately 2,000 ohms for low frequencies and is much less at high frequencies. Accordingly the amplifier input impedance is made low in respect to the detector impedance in order that additional pavement units may be placed in parallel as indicated in Figure 1, supplying the same impulse responsive unit without altering the characteristics of the pavement unit. The magnetic pavement units which I use have an impedance of approximately 1,700 ohms, and at a point three feet from the bar along the perpendicular bisector of the unit, i. e., equidistant from the coils, the magnetizing force is approximately two gilberts per cm.

The primary of transformer 26 is supplied with 110 volts, 60 cycle A. C. and the secondary coil supplying the anodes of tube 27 is arranged to provide 350 volts A. C. between the center tap and each anode. Secondary coils 29 and 30 for supplying power to the filament heaters are respectively 5.7 and 6 volt coils.

The amplifier tubes, 35, 36 and 37 are pentodes and are selected so that they will have a high amplification factor, high mutual conductance, and low grid current. The tubes are biased sufficiently negative so that the grid current is reduced to a negligible value. The amplifier gain of the present embodiment may be considerably increased by placing filter condensers between the screen grid of each tube and ground. The circuit shown and the values cited herein are illustrative alone and constitute an embodiment I find satisfactorily adapted to the needs in my employment of this device, and it will be understood that numerous changes or rearrangement of the parts or substitutions for the values given may be made without departing from the invention.

In Figure 1 output circuit leads 24 and 25 are arranged to close a circuit from A. C. power thru signal S to ground to operate the signal S. It may be desirable to bring both leads from the signal and both leads from the magnetic unit into the control box instead of connecting one lead from each to ground as shown. Obviously output circuit leads 24 and 25 may be arranged to operate many other devices than signal S directly, such as door openers, sign illuminators, traffic actuated signal controllers or the like, as already pointed out.

The magnet used in the magnetic pavement unit need not necessarily be a slender bar magnet as shown but may be made in many other shapes. It is also to be appreciated that where a bar magnet is utilized the coils might be located off the ends of the bar coaxial with it, or anywhere where they could still be linked by a substantial portion of the magnetic field of the bar.

It will be appreciated that ordinarily at slow speeds two impulses will be produced by a single vehicle passing over the unit, since the individual effects of the axles predominate, but at higher speeds the magnetic material in the vehicle tends to act as one body thereby producing only one impulse, but in either case the total duration of impulse or impulses from the output relay is closely inversely proportional to the speed of the vehicle. This effect of separation or combination of the impulses may be varied by altering the values of the parameters in the electrical network.

Thus it will be seen that I provide a novel arrangement for the detection of vehicular traffic by means of a magnetic pavement unit in conjunction with a responsive device having a selective electrical network, an amplifying device for strengthening the impulses from the magnetic unit to operate an output relay whose contacts are operated for a period very closely inversely proportional to the speed of the actuating vehicle. From the foregoing description it is apparent that the magnetic pavement unit produces upon passage of a vehicle a short transient oscillatory impulse wave having a voltage and frequency substantially proportional to the speed of the passing vehicle; that the selective network attenuates all impulses received to substantially the same voltage value, and materially reduces high frequency signals and stray disturbances from trolley lines, A. C. power lines and the like; that rectifiers for supplying power to the amplifiers are provided which have a suitable time constant for eliminating line voltage surges normally caused by apparatus connected to the same power source; that the amplifier applies to the output tube and to the relay signals of substantially the same voltage value regardless of the speed of the actuating vehicle; and that the frequency of the wave impulse created initially by the magnetic unit is the controlling factor in the length of the operating period of the output relay.

It will be seen that all the objects above enumerated and others are attained by a device of the character disclosed. Obviously the illustrated form of the invention is to be construed only as one embodiment, and many changes may be made in the construction of the apparatus or alterations of the design thereof or rearrangements of the parts, including the substitution of different tubes for those shown or the omission of various resistors or condensers, or other changes, without departing from the spirit of the invention as defined by the claims.

I claim:

1. In a traffic detector the combination of means for generating a wave of electromotive force upon the close passage of traffic near said means, such wave having a range of frequency characteristic and a range of electromotive force both substantially proportional to the speed of such traffic, and a selective electrical network connected to said means and adapted to pass such waves of said frequency characteristic and to attenuate the waves of various frequencies in such range to substantially the same value of electromotive force so as to provide an output impulse of time length inversely proportional to said frequency characteristic.

2. In a traffic detector the combination of means for generating a wave of electromotive force upon the close passage of traffic near said means, such wave having a frequency and electromotive force characteristics both substantially proportional to the speed of such traffic throughout the normal range of speed of traffic, and a selective electrical network connected to said means and arranged to pass such wave with increasing attenuation substantially in proportion to such frequency so as to provide an output impulse of time length substantially inversely proportional to the speed of such traffic, said network comprising a relatively large capacitance in shunt across said generating means, a relatively low resistance also in shunt therewith, a relatively low capacitance and a relatively high resistance in series and also shunting said generator and another high resistance and low capacitance in series and connected in shunt with the first mentioned relatively high resistance, and providing output circuit connections across the last mentioned low capacitance.

3. In a traffic detector adapted to be located adjacent to a path of traffic and for detecting the passage of traffic in such path the combination of means providing a magnetic field, a coil located with respect to said field so as to generate a wave of electromotive force upon the passage of any unit of traffic containing magnetic material, said wave having a frequency characteristic substantially proportional to the speed of said traffic unit, and a combined electrical network and amplifier unit connected to said coil and adapted to pass such wave thru the network and amplifying the same with increasing attenuation of such wave as the frequency characteristic increases with higher traffic speeds.

4. In a traffic detector adapted to be located adjacent to a path of traffic and for detecting the passage of traffic in such path the combination of means providing a magnetic field, a coil located with respect to said field so as to generate a wave of electromotive force upon the passage of any unit of traffic containing magnetic material, said wave having a frequency and an electromotive force characteristic both substantially proportional to the speed of such traffic unit within the normal range of traffic speed, an electrical network and amplifier unit adapted to pass such wave and amplify it to provide output impulses suitable for signalling purposes, said network and amplifier unit including means for absorbing rapidly increasing portions of the electromotive force of said wave in proportion to the frequency characteristic of said wave within said normal range for rendering said output impulses substantially constant in electromotive force and substantially inversely proportional in time length to said wave frequency.

5. In a traffic detector adapted to be located adjacent to a path of traffic and for detecting the passage of traffic in such path the combination of means providing a magnetic field, a coil located with respect to said field so as to generate a wave of electromotive force upon the passage through said field of any unit of traffic containing magnetic material, said wave having its electromotive force substantially proportional to the speed of such traffic unit and its time length substantially inversely proportional to such speed within the normal range of speed of traffic, an electrical network and amplifier unit connected to said coil and adapted to pass such wave and amplify it to provide output impulses suitable for signalling purposes, said network and amplifier unit including means for absorbing increasing portions of the electromotive force of said wave in inverse proportion to its time length and in increasing direct proportion to its amplitude so as to provide an output impulse of electromotive force that is substantially constant in electromotive force value and inversely proportional in time length to the speed of traffic throughout said normal range.

6. In a traffic detector the combination of a bar of magnetic material magnetized to provide a magnetic field and a coil provided with ends for external electrical connection and interlinked with said field for generating a wave of electromotive force in said coil upon the passage of traffic containing magnetic material near said coil, such waves having a frequency dependent upon the speed of such traffic and a frequency range corresponding with the normal range of speed of such traffic, and a selective electrical network having input and output sides and adapted to pass such waves for providing output waves suitable for signaling purposes, and for dissipating waves of substantially all frequencies outside said range, said network comprised of a first relatively high resistance and a relatively low capacitance in series between the input and output sides of said network and connected on the input side to one end of the coil, a relatively high capacitance shunting said coil, a relatively low resistance also shunting said coil, a second relatively high resistance connected to the other end of said coil from a point between said first high resistance and low capacitance in series, and a relatively very low capacitance connected to said other end of the coil from a point on the output side of said first high resistance and low capacitance in series.

7. In a traffic detector the combination of a bar of magnetic material magnetized to provide a magnetic field and a coil provided with ends for external electrical connection and interlinked with said field for generating a wave of electromotive force in said coil upon the passage of traffic containing magnetic material near said coil, such waves having a frequency and an electromotive force both substantially proportional to the speed of such traffic and a frequency range corresponding with the normal range of speed of such traffic, a selective electrical network having input and output sides and adapted to pass such waves with increasing attenuation in accordance with increased frequency for providing output waves of substantially constant electromotive force and of time length inversely proportional to traffic speed suitable for signalling purposes, and for dissipating waves of substantially all frequencies outside said range, said network comprised of a first relatively high resistance and a relatively low capacitance in series between the input and output sides of said network and connected on the input side to one end of the coil, a relatively high capacitance shunting said coil, a relatively low resistance also shunting said coil, a second relatively high resistance connected to the other end of said coil from a point between said first high resistance and low capacitance in series, and a relatively very low capacitance connected to said other end of the coil from a point on the output side of said first high resistance and low capacitance in series.

8. In a device for detecting the passage of road vehicles containing magnetic material along a roadway in a magnetic field, the combination of a bar of magnetic material in said field, a coil encircling said bar and provided with ends for external electrical connection, said bar and coil being arranged in said field for generating waves of electromotive force in said coil upon passage of such vehicles, such waves having a frequency dependent upon the speed of such vehicles and a frequency range corresponding with the normal range of speed of such vehicles, and a selective electrical network having input and output sides and adapted to pass such waves for providing output waves suitable for signalling purposes, and for dissipating waves of substantially all frequencies outside said range, said network comprised of a first relatively high resistance and a relatively low capacitance in series between the input and output sides of said network and connected on the input side to one end of the coil, a relatively high capacitance shunting said coil, a relatively low resistance also shunting said coil, a second relatively high resistance connected to the other end of said coil from a point between said first high resistance and low capacitance in series, and a relatively very low capacitance connected to said other end of the coil from a point on the output side of said first high resistance and low capacitance in series.

JOHN L. BARKER.